April 27, 1937. H. COLTMAN 2,078,315
AUTOMATIC CONTROL VALVE
Filed Nov. 11, 1935
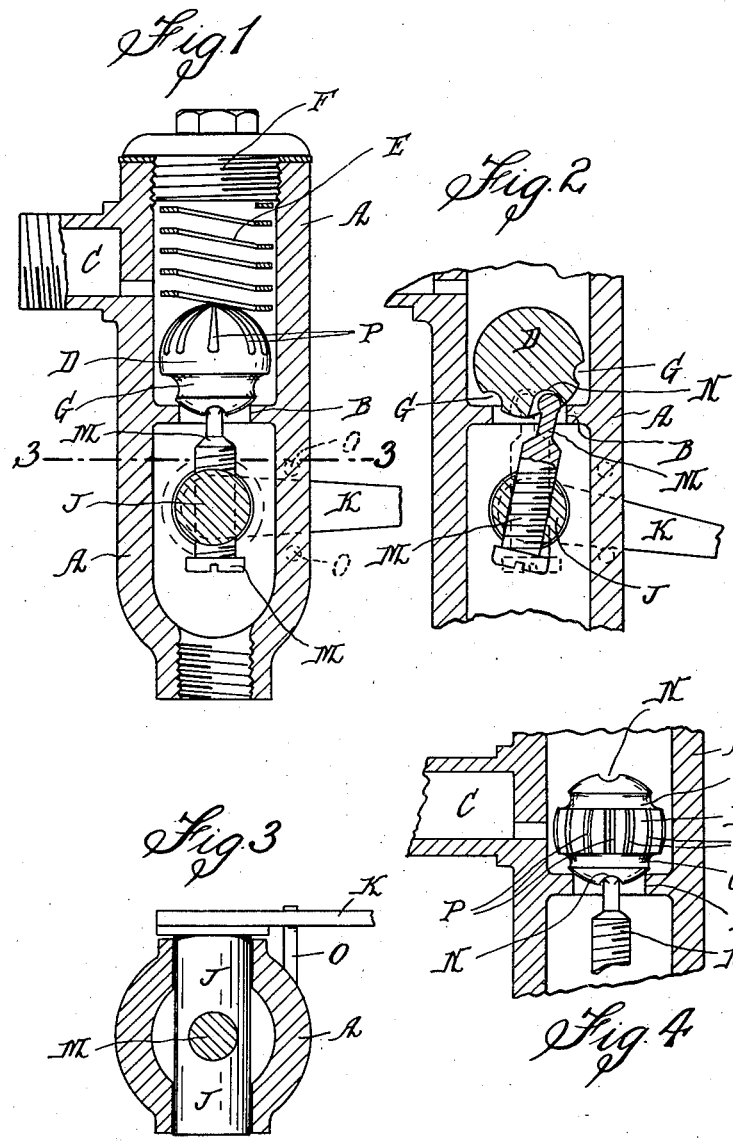
Inventor:
Harry Coltman
By Emil Bönnelyche
Attorney Patented Apr. 27, 1937

2,078,315

UNITED STATES PATENT OFFICE 2,078,315

AUTOMATIC CONTROL VALVE

Harry Coltman, Nelson, New Zealand

Application November 11, 1935, Serial No. 49,281
In New Zealand December 6, 1934

7 Claims. (Cl. 137—104)

This invention has reference to an improved construction of valve adapted for use in any of the circumstances in which the passage of fluids is required to be automatically controlled to commence and to stop as stored quantities of the fluid are used and are replaced. More particularly the invention has particular application to a valve for use in respect of water storage cisterns, and in other analogous circumstances, for controlling the filling of the cistern after it has been discharged, and for its operations to open and to close being effected by a float lever in the well known manner.

The invention consists broadly in the use within a cylindrical casing, of a ball valve made with a peripheral groove, which is designed in one position of the ball to close the passage through the casing and in another position obtained by rocking the ball on its axis, to open a way through the casing by the said groove or passage, and in the combination with such ball valve, of float actuated mechanism whereby on the up and down movements of the float, the ball valve will be moved to occupy its respective positions.

In fully describing the invention, reference will be made to the accompanying sheet of drawings, in which:—

Figure 1 is an elevation of the valve, the casing being shown in section and the valve in the closed condition.

Figure 2 is a sectional elevation of the ball valve and its operating means, with the ball shown in the position under which the valve is open.

Figure 3 is a sectional plan on the line 3—3 of Figure 1.

Figure 4 is a detail illustrating an alternative form of the ball.

In giving effect to the invention a vertical cylindrical casing A is provided such casing having an internal edge B surrounding a restricted opening formed at about midway in its height and constituting a valve seat. An inlet connection C leads from the side of the casing above the valve seat, while the bottom of the casing is open and made to receive a discharge pipe.

A ball valve D is provided to loosely fit within the casing and to rest on the valve seat B to close the passage therethrough. This ball is kept closely on its seat by means of the helical spring E arranged above it and compressed between it and the screw cap F covering the upper end of the casing. The said ball D is made with the groove G extending circumferentially around its lower half, or instead of the groove, a passage may be bored through the ball, parallel with its horizontal axis, at about the level of the groove. This groove, or passage, is so made and positioned that when it lies horizontally a solid portion of the ball rests on the valve seat to close the valve in an effective liquid tight manner, but when the ball is turned on its horizontal axis, the groove, or passage, will provide a connection between the upper and lower sides of the valve seat, as shown in Figure 2.

The invention embodies means whereby under an ordinary float lever control, the valve is actuated to close and is maintained closed when the float rises, and is opened and kept open when the float falls. For this purpose it is required that the float shall have sufficient weight, and also sufficient buoyancy, to effect a leverage such as will overcome the frictional resistance of the ball to turn caused by the pressure of the spring E thereon, when the level of the liquid supply concerned with the valve's operations, falls and rises.

The means for this purpose comprise a shaft J which is journalled in the lower part of the casing A to extend diametrically therein, and has the float lever K secured to one of its ends, outside the casing, so that the up and down movements of the lever will impart a rocking action to the shaft. A pin M is provided to extend radially upward from the shaft, in the centre line of the casing, and this at its end is rounded and enters a cavity N formed in the bottom of the ball D and this engagement of the pin end in such cavity serves to keep the ball from any rocking movement other than that which may be imparted to it by the leverage of the pin in the rocking of the shaft J. These movements are therefore regulated to ensure that the groove G, or passage, will occupy the two positions before described in respect of the movements of the float lever K. In order to prevent any excess movement of this lever in each direction, stops O are fixed on the casing A to extend respectively across above and beneath the lever and thus to limit the movements to the space between the stops.

The said pin M is preferably combined with the shaft J by screwing diametrically through it, from its underside. This allows for the assembly of the parts within the casing being readily effected and also for the correct adjustment of the pin in relation to the ball cavity.

If desired, the ball D may have the upper part of its periphery formed with grooves P radiating from its top centre all around. The presence of these grooves will result in the ball having a turning action imparted to it on its vertical axis by the impingement of the entering water upon the ball top as it enters the side of the casing, and thus will cause the ball to grind upon its seat to some extent and thereby to maintain its effective liquid tight seating.

In some instances the ball D may be made as shown in Figure 4, with a second groove G in its peripheral surface disposed parallel with but on the opposite side of the centre from that of the first groove before described. A second cavity N is also formed in corresponding relationship to this second groove. This formation allows for the ball being used on either of two portions of its periphery to effect the valve closure and opening in the manner before described, thus providing for a new surface being used should one become worn.

With this formation of the ball, the grooves P are made to extend in its surface between the two grooves and the ball seat B is so positioned in the casing A that the entering water will impinge on the grooves, as shown in Figure 4.

While the invention has been described and is shown in the drawing as concerned with a valve arranged vertically, it will be understood that the same construction and working may be effected when the valve is arranged at other angles than the vertical, the only requirement being to dispose the float lever K at the angle with the shaft J such that the lever extends horizontally, or approximately horizontally.

I claim:

1. An automatic control valve comprising a cylindrical valve casing having an inlet at one end and an outlet at the other and formed with a valve seat positioned between such ends, a ball arranged on the valve seat on the inlet side thereof, which ball is formed with a groove around a portion adjacent said seat and is adapted in one position on its seat to close the passage through the casing and in another position on its seat to open up such passage through the said groove, and float lever actuated means designed in the rising and falling movements of the lever, to turn the ball on the valve seat to to the respective aforesaid positions.

2. In an automatic control valve according to claim 1, means for keeping the said ball in close engagement upon the valve seat, comprising a helical spring arranged in the inlet end of the casing and compressed between the ball and a cover cap screwed into the casing end.

3. In an automatic control valve according to claim 1, the combination with the said ball formed with a cavity in its surface that is positioned over the valve seat, of a shaft arranged to extend diametrically across the casing at the outlet end thereof and journalled to rotate in the casing wall, a float lever fixed to one end of the shaft, outside the casing, to radiate therefrom, and a pin attached to the shaft, inside the casing, to radiate therefrom and the end of which pin enters the said cavity in the ball.

4. In an automatic control valve according to claim 1, the combination with the said ball formed with a cavity in its surface that is positioned over the valve seat, of a shaft arranged to extend diametrically across the casing at the outlet end thereof and journalled to rotate in the casing wall, a float lever fixed to one end of the shaft, outside the casing, to radiate therefrom, and a pin formed as a screw and passing through the shaft inside the casing, to radiate therefrom and the end of which pin enters the said cavity in the ball.

5. An automatic control valve according to claim 1, in which the said ball is made with grooves in its peripheral surface lying in planes perpendicular to the plane of the valve seat.

6. A valve comprising a valve casing having an inlet at one end and an outlet at the other end, a partition between said ends having an opening therein surrounded by a valve seat, a ball arranged on said seat to close said opening, said ball having an annular groove extending about the same, the lower edge of said groove lying in a plane parallel to the valve seat when said opening is closed by the ball and having a diameter slightly greater than the opening in the valve seat closed by the ball, the upper edge of said groove lying in a plane parallel to the valve seat when said opening is closed and in the same semi-spherical portion of the ball as the lower edge of said groove, and means for sliding said ball on the seat about its axis lying in a plane parallel to the valve seat to bring a portion of said groove into communication with the opening in the valve seat to provide a flow path through said groove into the opening in the valve seat.

7. A valve comprising a valve casing having an inlet at one end and an outlet at the other end, a partition between said ends having an opening therein surrounded by a valve seat, a ball arranged on said seat to close said opening, said ball having an annular groove extending about the same, the lower edge of said groove lying in a plane parallel to the valve seat when said opening is closed by the ball and having a diameter slightly greater than the opening in the valve seat closed by the ball, the upper edge of said groove lying in a plane parallel to the valve seat when said opening is closed and in the same semi-spherical portion of the ball as the lower edge of said groove, means for sliding said ball on the seat about its axis lying in a plane parallel to the valve seat to bring a portion of said groove into communication with the opening in the valve seat to provide a flow path through said groove into the opening in the valve seat, and means for resiliently maintaining said ball on its seat in all positions of adjustment.

HARRY COLTMAN.